(12) United States Patent
Pahr et al.

(10) Patent No.: US 7,898,316 B2
(45) Date of Patent: Mar. 1, 2011

(54) DOUBLE SAMPLE ACTIVE PIXEL SENSOR WITH DOUBLE SAMPLING TEMPERATURE SENSOR

(75) Inventors: Per Olaf Pahr, Lier (NO); Alf Olsen, Oslo (NO); Eric R. Fossum, Wolfeboro, NH (US)

(73) Assignee: Aptina Imaging Corporation, George Town (KY)

( * ) Notice: Subject to any disclaimer, the term of this patent is extended or adjusted under 35 U.S.C. 154(b) by 748 days.

(21) Appl. No.: 11/898,907

(22) Filed: Sep. 17, 2007

(65) Prior Publication Data

US 2008/0074525 A1 Mar. 27, 2008

Related U.S. Application Data

(62) Division of application No. 10/202,623, filed on Jul. 22, 2002, now Pat. No. 7,280,139.

(60) Provisional application No. 60/306,718, filed on Jul. 20, 2001.

(51) Int. Cl.
*H01L 35/00* (2006.01)

(52) U.S. Cl. .......................... 327/512; 327/539
(58) Field of Classification Search ................. 327/512, 327/513, 539; 374/163, 170
See application file for complete search history.

(56) References Cited

U.S. PATENT DOCUMENTS

| 5,877,715 | A | 3/1999 | Gowda et al. |
| 5,961,215 | A * | 10/1999 | Lee et al. ..................... 374/178 |
| 6,191,644 | B1 * | 2/2001 | Srinath et al. ............... 327/539 |
| 6,630,955 | B2 | 10/2003 | Takada |
| 6,642,776 | B1 | 11/2003 | Micheloni et al. |

* cited by examiner

*Primary Examiner*—Long Nguyen

(57) ABSTRACT

A system which operates to determine temperature of an image sensor using the same signal chain that is used to detect the image sensor actual outputs. A correlated double sampling circuit is used to obtain the image outputs. That's same correlated double sampling circuit is used to receive two different inputs from the temperature circuit, and to subtract one from the other. The temperature output can be perceived, for example, once each frame.

8 Claims, 4 Drawing Sheets

DOUBLE SAMPLE ACTIVE PIXEL SENSOR WITH DOUBLE SAMPLING TEMPERATURE SENSOR

CROSS-REFERENCE TO RELATED APPLICATIONS

This is a divisional application of U.S. patent application Ser. No. 10/202,623 filed Jul. 22, 2002, the entirety of which is incorporated herein by reference.

BACKGROUND

Image sensors strive for more accuracy in the image readout chain. Different techniques are used, including techniques to cancel out various kinds of noise. Different characteristics of image sensors are also dependent on temperature. Accordingly, temperature compensation may also be used to monitor for, and correct for, errors in the acquired signal.

The present application teaches a new technique allowing reading out a signal that is proportional to the temperature of an image sensor. This temperature may be used to compensate for the effect of the temperature on an image sensor pixel array.

BRIEF DESCRIPTION OF THE DRAWINGS

These and other aspects will now be described in detail with reference to the accompanying drawings, wherein.

DETAILED DESCRIPTION

Figure 1:
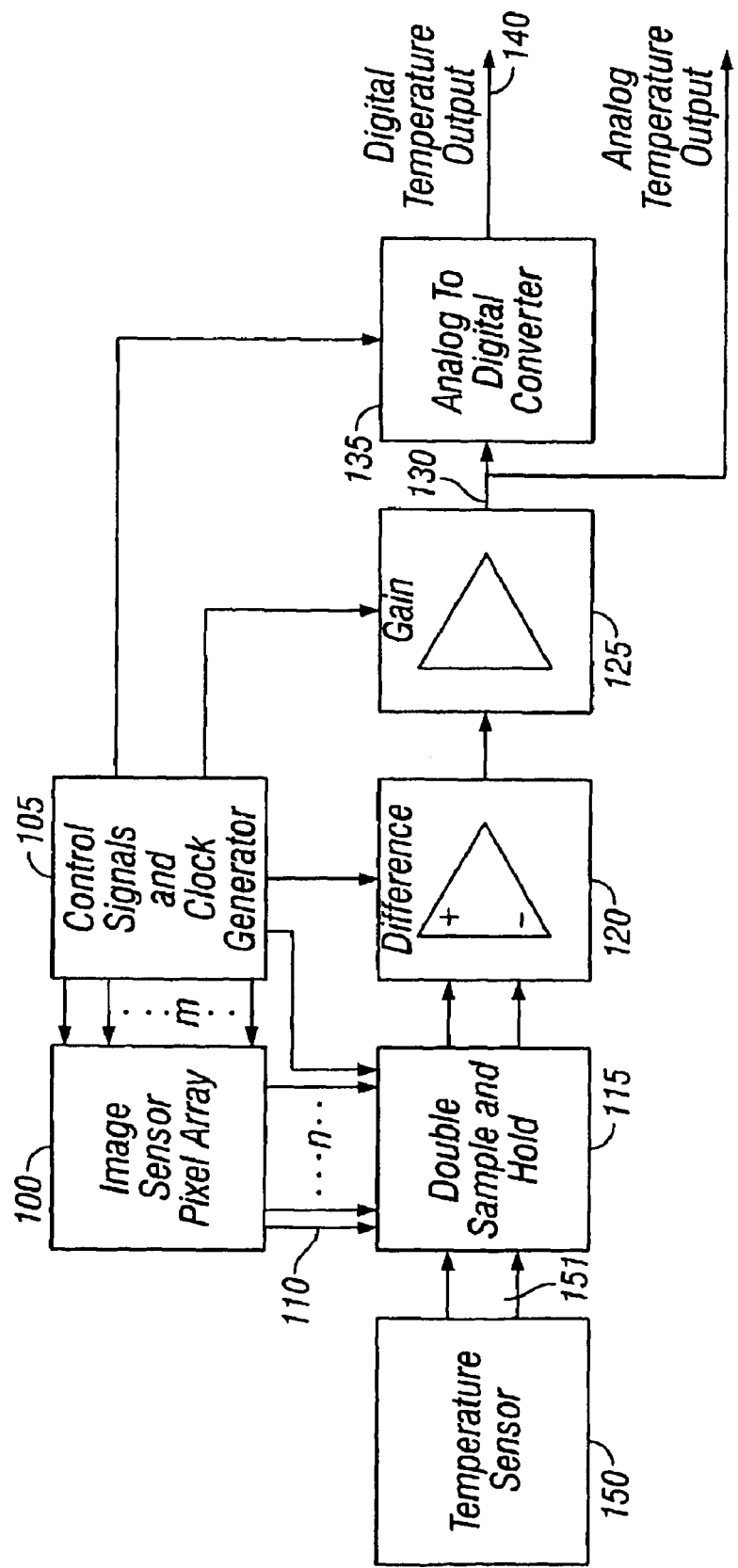
FIG. 1 shows a block diagram of the system.

An embodiment is shown in FIG. 1, which illustrates a block diagram of an image sensor with an included temperature sensor. Basically, this system provides an image sensing system in which outputs can represent either the output of the image sensor, and/or at temperature of the image sensor, e.g. the temperature of the substrate on which the image sensor is formed. The system includes an improved temperature sensor circuit which determines the temperature of the substrate, e.g. the silicon.

The system of FIG. 1 shows an active pixel sensor, which may be formed using CMOS circuitry for example. However, these techniques may also be applied to any other family or type of image sensor. An image sensor pixel array 100, for example an image sensor array having "m" rows and "n" columns, is driven by a control signal generator 105 that generates control signals and clock pulses for the pixel array. The output of the pixel array 110 is provided in parallel form to a double sample and hold circuit 115, that is, one which holds two values. Sample and hold circuit 115 may carry out a correlated double sampling from the image sensor, to produce an output signal that is proportional to the difference between the value of each pixel prior to light integration, and the value of the pixel after the light integration is complete. The difference circuit 120 may determine the difference between the two signals. Controlling element 105 may also produce the control signals for the difference circuit 120. The output of difference circuit 120 is amplified by a gain circuit 125, and output as an analog signal 130. The final output signal may be this analog signal 130. Alternatively, an A/D converter 135 may be used to produce a digital output 140 indicative of the analog signal 130.

A second input to the double sample and hold circuit 115 comes from a temperature sensor 150. The output 151 of the temperature sensor is also received by the sample and hold circuit 115, and passes through the signal chain in the same way as the image sensor outputs.

In this way, a signal which is directly proportional to temperature can be received from the temperature sensor 150. This may be done, for example, during a time slot while the image readout is inactive. It may be done for example at the beginning of each image, or at the beginning or end of each one frame, or every few lines, or any other interval of pixels or time. In this way, changes in temperature which fluctuate on a relatively short time frame may be used as correction, as often as desired.

In a typical implementation of an image sensor, such as the one described herein, a hotter chip provides a whiter image, or put another way, the black level of an image pixel has a higher voltage than the white level. Increasing the temperature causes a correspondingly decreased pixel signal voltage. This is the typical case when a pixel photodiode is implemented in a P type silicon or P type diffusion well. In the opposite case, where an N type substrate or N type well is used to embed the photoreceptor, an increasing voltage may correspond to a higher temperature. A relationship between the temperature and the amount of compensation of image output may be stored.

Figure 2:
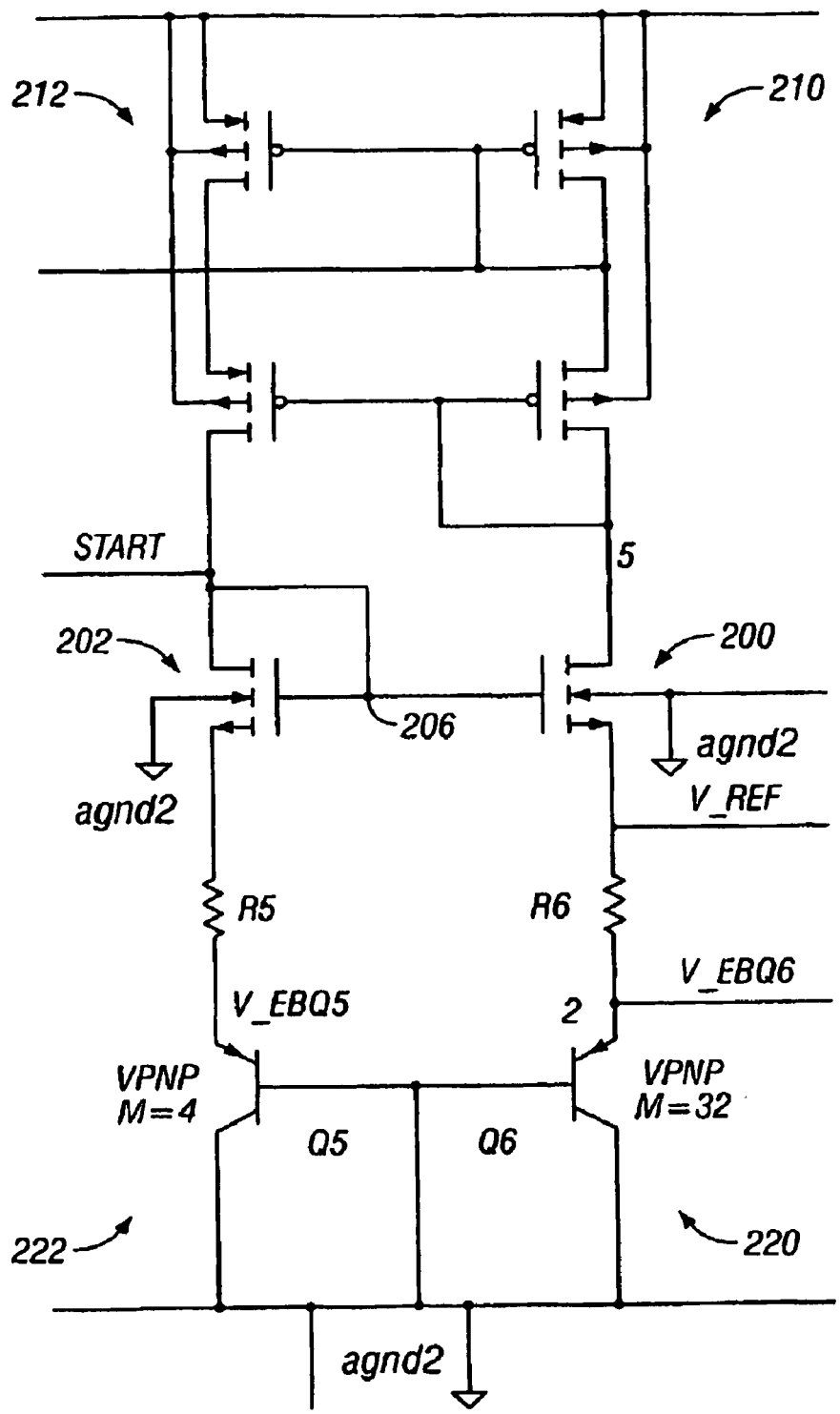
FIG. 2 shows a circuit diagram of a bandgap cell.

A so-called bandgap cell is shown in FIG. 2. This cell includes the temperature and voltage stabilized output labeled as $V_{REF}$. The output $V_{EB,Q6}$ is a voltage drop away from the reference voltage, and has a linear and negative temperature coefficient relative to that reference voltage. In this system, a startup transient current input is required at the node labeled "START". After reaching steady-state, the currents in transistors Q5 and Q6 eventually equalize.

The FIG. 2 circuit is based on the Brokaw type bandgap reference circuit which is well-known.

In FIG. 2, the two NMOS transistors 200, 202 share the same gate voltage by virtue of their common gate node 206. The transistors 200, 202 are matched to have the same or similar transconductance. Therefore, the source potentials will be the same when they conduct the same current.

The CMOS transistors 210, 212 form a current mirror keeps the source potential of the two NMOS transistors 200, 202 constant. The current mirror is also part of a closed looped amplifier which insures that the source potential of the NMOS transistors will be kept low due to feedback. This loop should be kept stable.

Equal currents are hence forced through the two base P-N junctions of the diode-coupled transistors 220,222. These transistors have different areas, with the area ratio between transistor 222 and 225 being 4:32 equals 1:8. Because of this area difference, there will be a difference in the P-N junction voltage drop across the junctions according to $$\Delta V_{EB} = V_{EB,Q5} - V_{EB,Q6} \qquad (1)$$

It can be shown that $$\Delta V_{EB} = V_T \cdot \ln(1/8) = -(kT/q) \cdot \ln(1/8) = -25.84 \cdot \ln(1/8) \text{mV} = +53.74 \text{mV} \qquad (2)$$

at T=300 K.

Therefore, $\Delta V_{EB}$ has a positive temperature coefficient proportional to absolute temperature. The $V_T$ is called the thermal voltage, K is Boltzmann's constant, T is absolute temperature in degrees Kelvin and Q is the charge of an electron. The P-N junctions have negative temperature coefficients of about 2 mV per degrees K. By balancing these two coefficients at a chosen temperature $T=T_\Theta$, a close to 0 temperature coefficient can be obtained at that temperature.

In order for the two currents in FIG. 2 to be equal, the resistor R6 must be greater than the resistor R5. The value $\Delta R$ is defined as the difference R6-R5. The two operating currents are then given by $$I_{Q5,Q6}=\Delta V_{EB}/\Delta R$$

Since $R6=R5+\Delta R$, the output reference voltage will be:

$$V\_REF=V_{EB,Q6}+\Delta V_{EB}+R5\cdot|_{Q5,Q6}$$

$$V\_REF=V_{EB,Q6}+\Delta V_{EB}+(R5/\Delta R)\cdot \Delta V_{EB}$$

$$V\_REF=V_{EB,Q6}=(1+R5/\Delta R)\cdot \Delta V_{EB} \quad (3)$$

The operating currents and current densities of Q5 and Q6 may be selected to provide a negative temperature coefficient for the $V_{EB}$ determined in equation 3. This can be balanced against the positive temperature term by the resistor ratio R5/$\Delta R$ and also by changing the area ratio between Q5 and Q6. In this particular embodiment this ratio 1:8.

The last part of equation 3 also shows that the last term is independent of any common production tolerance in the absolute value of the resistors. However, the operating current will still vary around the target design value. There will be a logarithmic variation in the first term $V_{EB,Q6}$ over multiple process runs, and hence also in the output voltage. In most cases, this variation is acceptable. There is also an acceptable variation in the negative temperature coefficient of $V_{EB,Q6}$.

According to this finding, the present application uses the double sampling part of the analog signal processing chain of an image sensor to obtain the difference between the voltage V_REF and $V_{EB,Q6}$, in order to output a signal directly proportional to the absolute temperature of the sensor as $$V\_PTAT=(1+R5/\Delta R)\cdot \Delta V_{EB}=(1+R5/\Delta R)\cdot (kT/q)\cdot \ln(A_{Q6}/A_{Q5})$$

Where $A_{Q6}/A_{Q5}$ are respective emitter areas of Q6 and Q5.

This enables temperature measurement to be carried out independently of process variations according to a first order. However, there may be second order variations in the term $\Delta V_{EB}$.

Figure 3:
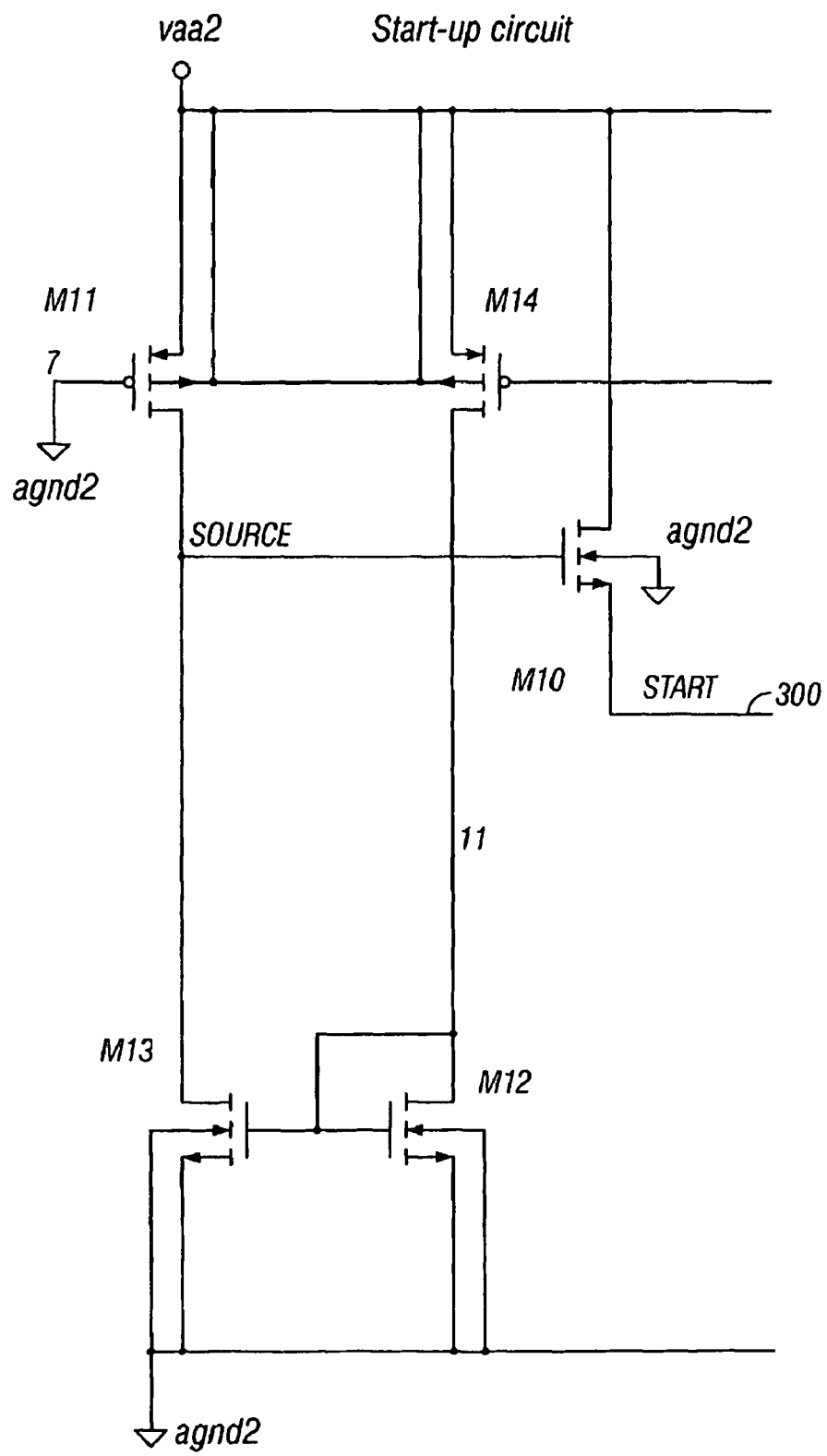
FIG. 3 shows a startup circuit for the bandgap cell.
Figure 4:
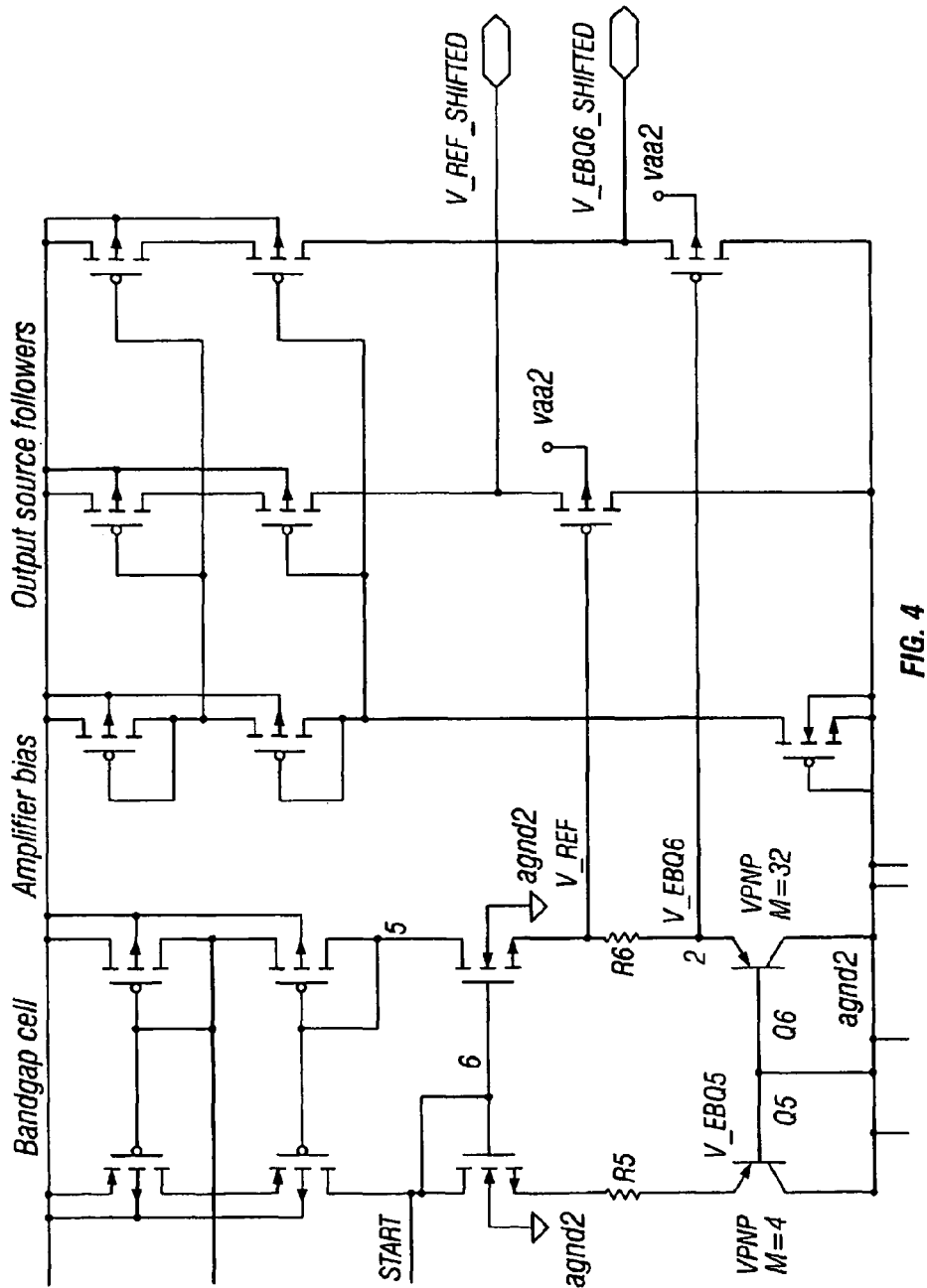
FIG. 4 shows an overall circuit.

FIG. 3 also shows a startup circuit for the bandgap cell shown in FIG. 2. In the FIG. 3 cell, the start node 300 begins with a relatively low potential during startup. Prior to start up, the gate potential of transistor M14 is high so that the transistor does not conduct current. Transistor M11 is a relatively long transistor and can be used as a resistor. M11 will hence always be conducting. This causes the transistor M10 to conduct and provide the start up current. When the FIG. 2 bandgap cell has started, this sets the gate potential of M14 and therefore M14 conducts current. That current is mirrored by the transistors M12, M13 to pull down the source node of M11 so that M10 stops providing its start up current. The circuit also has two buffers and level shifters as shown in FIG. 4. The level shifters bring the two output voltages up to the normal voltage range used for the output of the pixel source followers. These level shifters also lower the output impedance of the bandgap cell. Level shifting needs to be done using carefully matched transistor pairs and matched current sources for the source followers.

Accordingly, the bandgap cell has an inherent start current provided by the start current generating circuit thereby providing a temperature sensed output.

Although only a few embodiments have been disclosed in detail above, other modifications are possible.

What is claimed is:

1. A temperature sensing circuit for an image processing device, comprising:
   a bandgap circuit for producing a pair of output signals, one of the pair of output signals being related to a temperature of at least one component in the bandgap circuit, said bandgap circuit requiring a transient start-up current;
   a start-up current producing circuit, producing the transient start-up current and sensing operation of said bandgap circuit and reducing said transient start-up current relative to a duration of said sensed operation of said bandgap circuit; and
   a double sampling circuit for receiving the output signals and for receiving pairs of pixel signals from a coupled image array, said double sampling circuit configured to obtain a temperature difference between the output signals.

2. A temperature sensing circuit as in claim 1, wherein said start-up circuit includes a current mirror which conducts current once the bandgap circuit operation has started, to reduce a value of said start current.

3. The temperature sensing circuit as in claim 1, wherein the double sampling circuit comprises:
   a sample and hold circuit for receiving the output signals and pairs of pixel signals; and
   a difference circuit coupled to the sample and hold circuit for outputting the temperature difference.

4. The temperature sensing circuit as in claim 1, wherein one of the pair of output signals is a temperature and voltage stabilized output reference signal.

5. The temperature sensing circuit as in claim 4, wherein the output signal related to a temperature of at least one component varies in relation to the reference signal.

6. The temperature sensing circuit as in claim 1, wherein each pair of pixel signals includes a signal from a pixel prior to light integration and a signal from said pixel after light integration.

7. The temperature sensing circuit as in claim 1, wherein said transient start-up current is reduced to zero after the bandgap circuit begins operation.

8. The temperature sensing circuit as in claim 1, further comprising a level shifting circuit for lowering an output impedance of said bandgap circuit.

* * * * *